Nov. 20, 1934.    R. KMENT    1,981,733
LENS GRINDING MACHINE
Filed Dec. 13, 1932    5 Sheets-Sheet 2
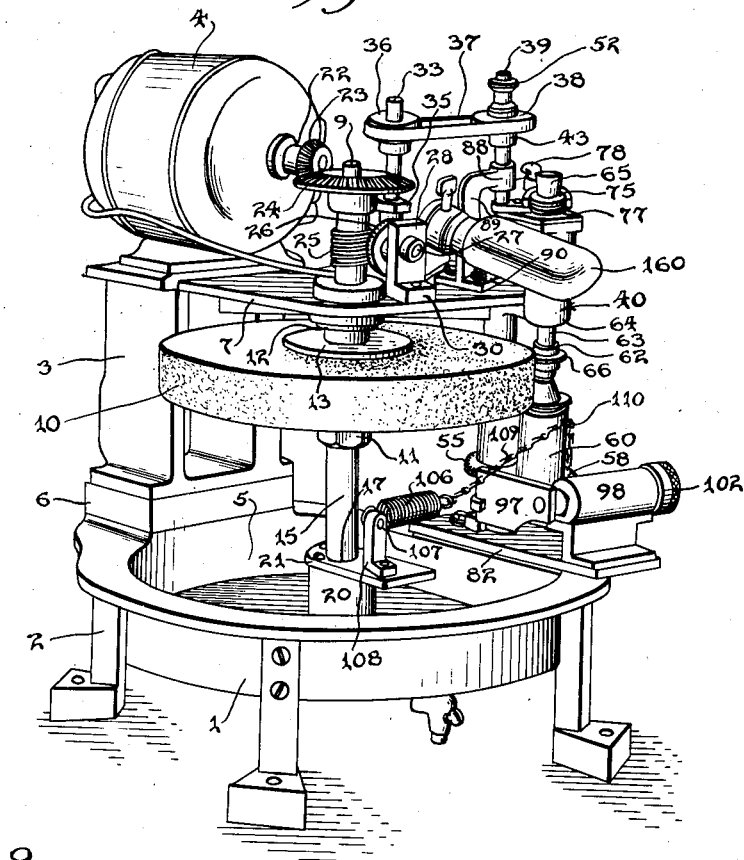
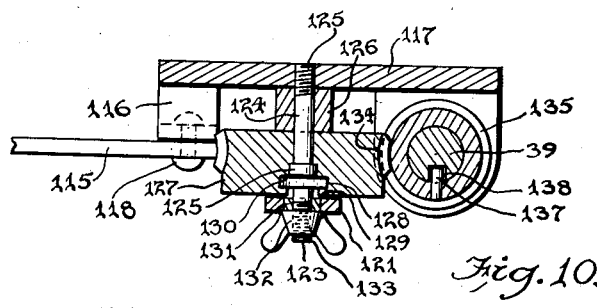
Inventor
Rudolf Kment,
Attorney Nov. 20, 1934.    R. KMENT    1,981,733
LENS GRINDING MACHINE
Filed Dec. 13, 1932    5 Sheets-Sheet 3
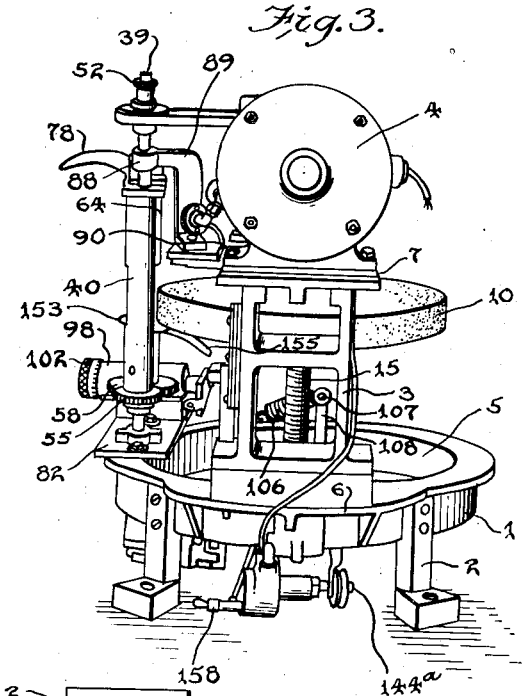
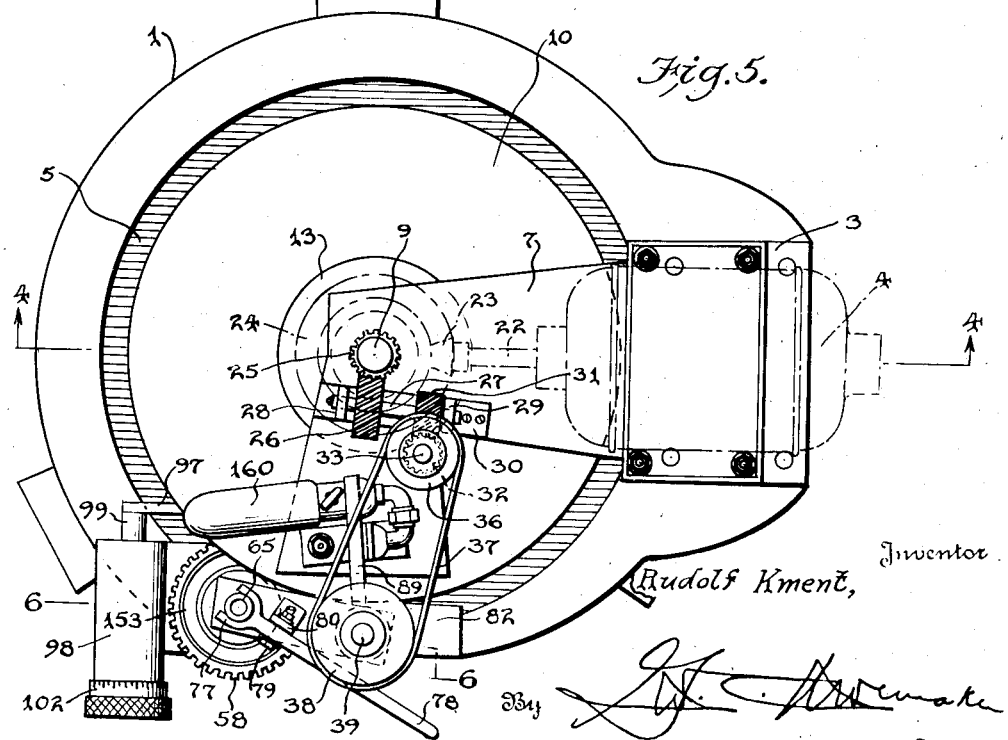
Inventor
Rudolf Kment,

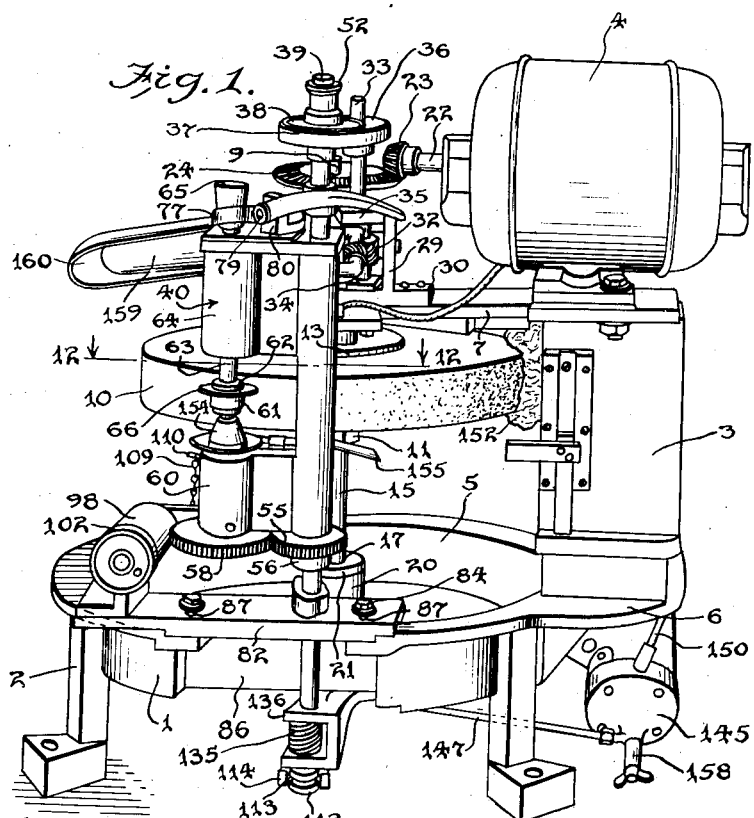
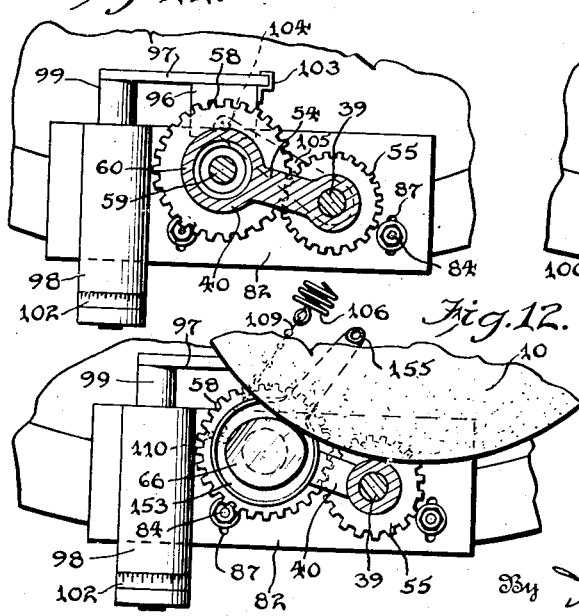
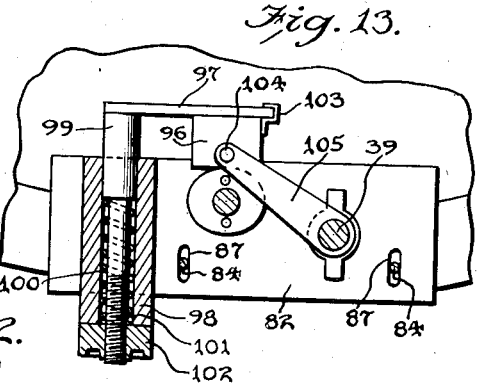

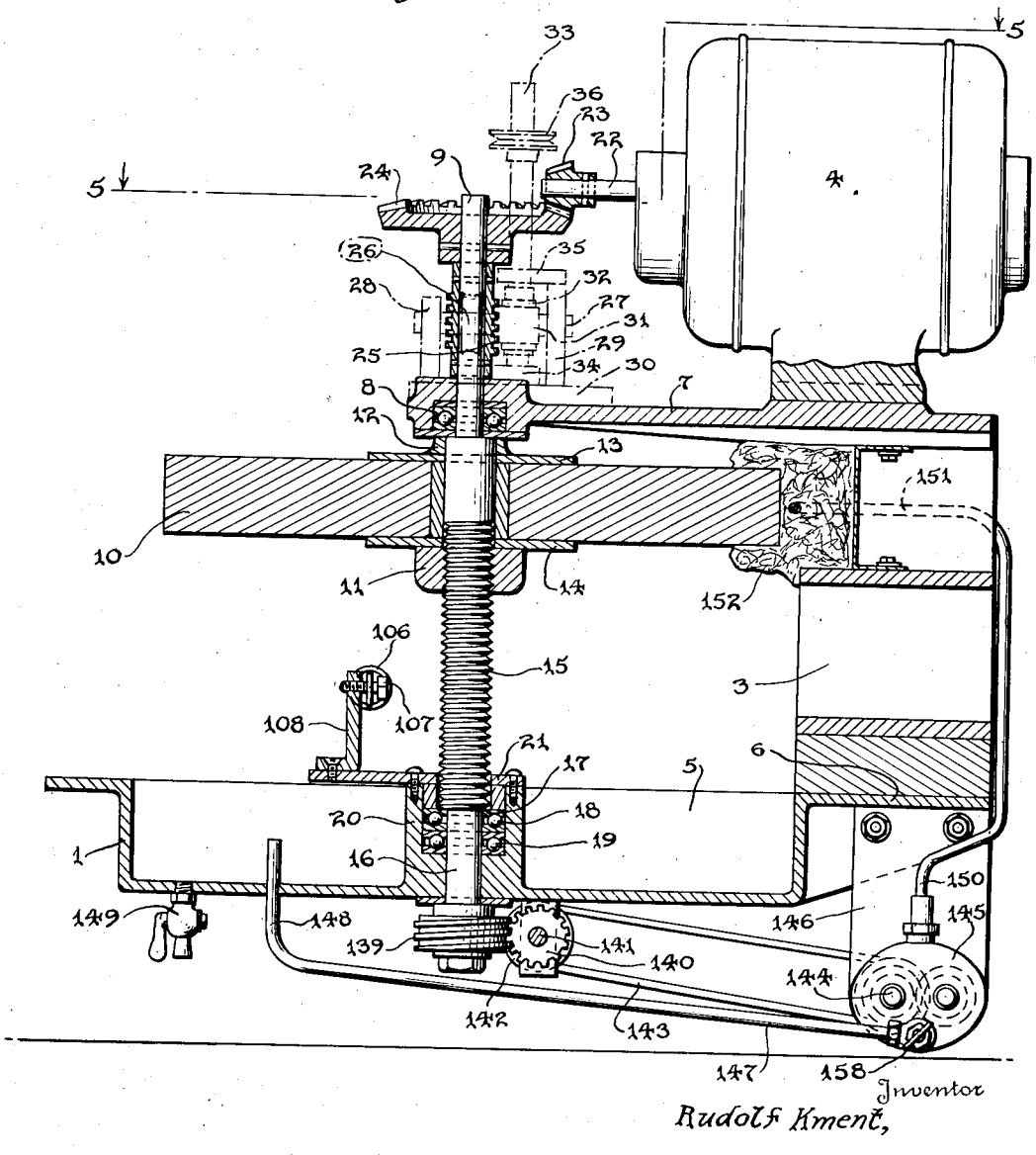

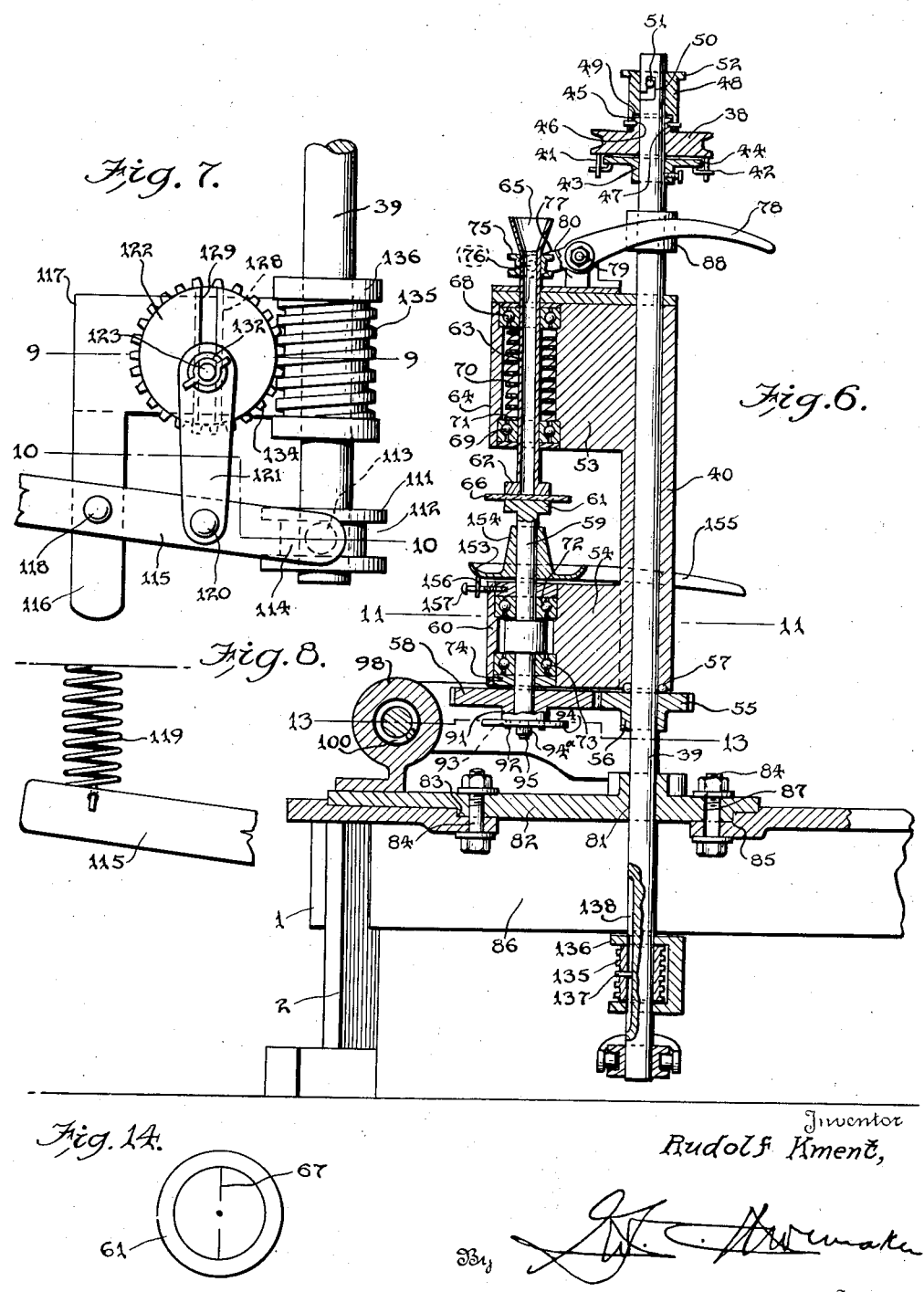

Patented Nov. 20, 1934

1,981,733

UNITED STATES PATENT OFFICE 1,981,733

LENS GRINDING MACHINE

Rudolf Kment, Rochester, N. Y.

Application December 13, 1932, Serial No. 647,047

14 Claims. (Cl. 51—101)

The invention relates to a lens grinding machine for grinding, to templets, the edges of lenses for optical and other purposes.

The principal object of the present invention is to provide a lens grinding machine adapted to enable one or more lenses to be readily placed in proper position for grinding without removing and replacing any of the parts of the machine and capable of enabling the lenses to be readily inspected at all times during the grinding operation to ascertain if the lenses are in proper position in the lens clamping means and to detect any trouble due to a misalignment of the lenses with a target of the lens clamping means and to readily correct such trouble should a lens accidentally get out of a central position and out of alignment with the target.

A further object of the invention is to provide a lens grinding machine adapted for the edge grinding of one or two lenses or a pile of lenses and equipped with means operable during the grinding of one or two lenses to move the same transversely with relation to the periphery of the grinding stone to produce a uniform wear of the periphery of the grinding stone and to prevent the wearing of a groove into the same and the chipping of lenses resulting from the cutting of a groove in the grinding face or periphery of a grinding stone.

It is also an object of the invention when grinding the pile of lenses to enable the same to be maintained in a predetermined position with relation to the periphery of the grinding stone so that there will be no danger of the lenses slipping off the periphery of the grinding stone during the grinding operation.

Furthermore, it is an object of the invention to provide simple, practical and efficient means for supplying water to the periphery of the grinding stone and to remove excess water from the grinding stone and to return to the water reservoir such excess of water and also the drip from the lenses whereby the water may be used over and over again and the machine maintained in a dry condition.

Another object of the invention is to enable lenses to be readily changed or adjusted without stopping the rotation of the grinding stone.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Figure 1 is a perspective view of a lens grinding machine constructed in accordance with this invention and viewed from the front.

Fig. 2 is a similar view of the lens grinding machine viewed from the back.

Fig. 3 is a perspective view of a lens grinding machine viewed from one side thereof.

Fig. 4 is a central vertical sectional view taken substantially on the line 4—4 of Fig. 5.

Fig. 5 is a horizontal sectional view taken substantially on the line 5—5 of Fig. 4.

Fig. 6 is a vertical sectional view taken substantially on the line 6—6 of Fig. 5.

Figs. 7 and 8 are detail views of the mechanism for imparting upward and downward movement to the swinging lens carriage.

Fig. 9 is a detail sectional view taken substantially on the line 9—9 of Fig. 7.

Fig. 10 is a detail sectional view taken substantially on the line 10—10 of Fig. 7.

Fig. 11 is a detail horizontal sectional view taken substantially on the line 11—11 of Fig. 6.

Fig. 12 is a detail sectional view on the line 12—12 of Fig. 1.

Fig. 13 is a detail horizontal sectional view taken substantially on the line 13—13 of Fig. 6.

Fig. 14 is a detail view of the lower lens clamping member showing the target for properly positioning the lenses.

In the accompanying drawings in which is illustrated the preferred embodiment of the invention, the lens grinding machine is provided with a main frame preferably consisting of a casting and comprising a base 1 supported by suitable legs 2 and provided with a vertical column 3 rising from one side of the base and supporting an electric motor 4. The main frame may be of any other suitable construction and the base is in the form of an open reservoir having a water chamber 5 and consisting of a bottom and side walls and provided at the upper edges thereof with an outwardly extending horizontal flange 6 extended at one side to form a support for the column 3 which may be formed integral with the base or be otherwise constructed, as will be readily understood.

Secured to the top of the column 3 is a horizontal frame member 7 consisting of a substantially L-shaped plate extending inwardly from the column and provided adjacent its angle with a ball bearing 8 for the reception of the upper portion of a main vertical shaft 9, which has mounted upon it a horizontal rotary grinding stone 10. The rotary grinding stone 10 is fixed to the vertical shaft 9 by means of a nut 11 which clamps the grinding stone between it and a fixed collar 12 of the said shaft 9. A plate 13 is interposed between the collar 12 and the upper face of the grinding stone and a similar plate 14 is arranged between the lower face of the grinding stone and the nut 11 which is arranged on a lower threaded portion 15 of the main vertical shaft 9. The lower terminal portion 16 of the vertical shaft 9 is reduced to form a shoulder 17 and is arranged in thrusts and annular bearings 18 and 19 located in a central tubular housing 20 of the base of the frame of the grinding machine.

The shoulder 17 rests upon the thrust bearing 18 and the tubular cylindrical housing 20 which forms a central socket to receive the said bearings 18 and 19, is covered by a plate or member 21 which is adapted to exclude dust and water from the bearings.

The motor is mounted directly upon the frame member 7 and the motor shaft 22 which extends inwardly toward and in substantial alignment with the upper end of the main shaft 9 is provided with a vertical bevel pinion 23 which meshes with a horizontal bevel gear wheel 24 keyed or otherwise secured to the upper end of the shaft 9 whereby when the motor is started rotary motion will be communicated to the vertical shaft 9 and the rotary grinding stone 10. The main shaft 9 is provided at its upper portion with a worm 25 which meshes with a worm wheel 26 mounted on a short horizontal shaft 27 which is journaled in suitable bearings of posts 28 and 29 of a bearing bracket 30 bolted or otherwise secured to the upper face of the horizontal member 7. The short horizontal shaft 27 is provided adjacent one end with a worm or spiral gear 31 which meshes with a spiral gear or worm wheel 32 of a short vertical shaft 33 stepped at its lower end in a suitable bearing 34 of the bearing bracket 30 and journaled intermediate of its ends in a suitable bearing of a horizontal arm 35 extending from the upper end of the post 29. The short vertical shaft 33 is provided at its upper end with a horizontal grooved pulley 36 which is connected by a belt 37 with a horizontal grooved pulley 38 slidably mounted on the upper portion of a vertical shaft 39 which constitutes a pivot for a horizontally swinging vertically movable lens carriage 40.

The vertical shaft 39 which is driven by the motor and which constitutes a pivot for the lens carriage is rotatable and also vertically slidable to raise and lower the lens carriage during the grinding operation when one or two lenses are being ground to prevent a groove from being worn in the periphery of the grinding stone. While a belt and pulley, bevel gearing and spiral or worm gearing are illustrated in the drawings for transmitting motion from the motor to the central vertical shaft and to the shaft 39, any other form of gearing may, of course, be employed, as will be readily understood.

The pulley 38 which is slidable on the upper portion of the shaft 39 is also freely rotatable thereon when unclutched therefrom, and any suitable form of clutch may be employed for connecting the pulley 38 with the shaft 39 and for disconnecting it therefrom. One form of clutch is illustrated in the drawings and consists of spaced depending vertical pins 41 carried by the pulley 38 and arranged to engage with horizontally projecting pins 42 carried by a collar 43 suitably fixed to the upper portion of the shaft 39 and provided at the top with an annular flange 44 to which the pins 42 are secured. Any other suitable coacting interlocking means may, of course, be provided on the pulley and the collar 43, as will be readily understood. The pulley is provided at the top with an annular flange 45 constituting a hub extension of the pulley and having an exterior annular groove 46 into which extends opposite projections 47 of a slidably operating sleeve 48 arranged on the upper portion of the shaft 39 and interiorly recessed at its lower end at 49 to receive telescopingly the hub extension of the pulley 38.

The projections 47 preferably consist of screws threaded into the operating sleeve 48 at the lower end thereof and having smooth terminal portions projecting into the annular groove 46 of the hub extension of the pulley 38. By this construction the operating sleeve is connected with the pulley 38 and is adapted to raise and lower the same without interfering with the rotation of the pulley 38 or necessitating the stopping of the motor to disconnect the vertical shaft 39 therefrom. The operating sleeve 48 is provided with an L-shaped slot 50 consisting of a vertical main portion and a horizontal branch located at the lower end of the main portion and adapted to receive a projection 51 carried by the shaft 39 and adapted to support the operating sleeve and the pulley in an elevated position to unclutch the pulley 38 from the shaft 39. The operating sleeve 48 is provided at its upper end with a flange 52 to enable it to be readily grasped by the operator for manually raising and lowering the operating sleeve and for partially rotating the same to engage the horizontal branch of the L-shaped slot with the projection 51 and to disengage it therefrom. When the operating sleeve is partially rotated to carry the horizontal branch of the slot 50 out of engagement with the projection 51 to permit the sleeve and the pulley to slide downwardly on the shaft 39 for engaging the clutching members formed by the pins 41 and 42 with each other. When the operating sleeve is supported in its elevated position by the pin 51 the pulley 38 is adapted to rotate freely on the shaft 39.

The lens carriage 40 consists of a vertical tubular portion and upper and lower horizontal portions 53 and 54 preferably formed integral with and extending from and connected by the vertical tubular portion which is arranged on the shaft 39 and which is supported by a horizontal spur gear 55 provided at its lower face with a hub extension 56 and having ball bearings 57 at its upper face to support the lens carriage without the weight of the carriage interfering with the free rotation of the shaft 39. The hub extension 56 is suitably fixed to the shaft 39 and the horizontal gear 55 meshes with a horizontal gear 58 fixed to a lower vertical spindle 59 journaled in a tubular portion or housing 60 of the lower arm or portion of the lens carriage. The gear wheel 58 is of greater diameter than the gear wheel 55 to secure the desired reduction in speed of the spindle 59 and the latter is provided at its upper end with a lens clamping member 61 which cooperates with a lens clamping member 62 of an upper tubular spindle 63 mounted in an upper tubular portion or housing 64 of the upper arm 53 of the lens carriage 40. The upper tubular spindle 63 is provided with a flared upper portion 65 forming an eye piece adapted to permit the operator to readily look through the upper spindle 63 and view the lens 66 in properly positioning the same on the lower lens clamping member 61 when arranging the lens in the grinding machine. The tubular spindle also enables the lens to be inspected from time to time to detect any error in the position of the lens and correct any trouble resulting from a lens accidentally slipping out of true alignment with the target 67 marked on the lower lens clamping member, as clearly illustrated in Fig. 14 of the drawings.

The upper tubular spindle 63 is journaled in upper and lower thrust and annular ball bearings 68 and 69 and it is urged downwardly into clamping engagement with a lens by means of a coiled spring 70 disposed on the tubular upper spindle 63 and arranged within the housing 64 of the lens carriage and interposed between the upper bearings 68 and a collar 71 or other suitable abutment carried by the upper spindle 69 and projecting exteriorly therefrom. Any suitable means may be provided on the outside of the tubular spindle 63 for engagement by the lower end of the spring 70 which maintains the lens clamping members 61 and 62 in firm engagement with a lens or plurality of lenses. The lower spindle is mounted in an upper annular bearing 72 and a lower thrust bearing 73 located within the housing 60 and the lower arm or portion 54 of the lens carriage 40. The lower thrust bearing 73 is adapted to carry the weight resulting from the downward pressure of the spring 70 and it is arranged upon a collar 74 detachably secured within the lower end of the housing 60 of the lens carriage, as clearly illustrated in Fig. 6 of the drawings.

The upper tubular spindle is provided above the lens carriage with a grooved collar 75 which is engaged by opposite inwardly extending projections 76 of a forked portion 77 of an operating lever 78 fulcrumed by a suitable pivot 79 on a post 80 extending upwardly from the top of the lens carriage, as clearly illustrated in Fig. 1 of the drawings.

The lever 78 is manually operable and at its outer arm which is of greater length than its inner arm is adapted to be readily depressed by the operator to lift the upper tubular spindle against the action of the spring 70 to permit a lens to be placed in the lens grinding machine and to be removed therefrom and also to be adjusted while in the machine. The operating means for raising and lowering the upper tubular spindle 63 is carried by the lens carriage and does not interfere with the free rotary movement of the spindle in the operation of the machine.

The shaft 39 is slidably mounted in a bearing 81 of an adjustable plate 82 having reduced terminal portions forming shouldered portions 83 which are secured by screws 84 in suitable recesses 85 in the flange or projecting portion of the base of the main frame. The recesses 85 which provide seats for the plate 82 are formed in spaced portions of the flange of the base of the main frame, an intervening space 86 being formed between the spaced recesses 85 to provide an opening for the lower portion of the shaft 39. The plate 82 is provided with slots 87 through which the screws 84 pass and the said plate 82 is adjustable inwardly and outwardly and is adapted to be moved inwardly, as the grinding stone wears. The upper portion of the shaft 39 is slidably mounted in a bearing 88 of an arm or post 89 provided with a foot 90 which is adjustably mounted on the bearing bracket 30 and which is adapted to be adjusted with the adjustable plate 82 for maintaining the shaft 39 in a vertical position.

As the grinding stone becomes worn the lens carriage may be adjusted inwardly to maintain the parts in proper position with relation to the grinding element.

The gear wheel 58 which is fixed to the lower end of the lower solid spindle 59 is provided with an integral collar or flange 91 having depending projecting pins 92 which are adapted to fit in perforations 93 of a templet 94 which is secured in position against the lower face of the collar or flange 91 by a nut 94$^a$ arranged on a threaded member 95 which may consist of a reduced terminal portion of the lower spindle 59. The templet which determines the exact shape of the lens, in the usual manner, bears against a floating abutment 96 which is slidable upwardly and downwardly on a stop 97 adjustable by a micrometer 98. The stop 97 consists of a vertical plate secured to and extending at right angles from the adjustable member 99 of the micrometer 98. The adjustable member 99 which is actuated by a spring 100 is threaded at 101 to receive a controlling or adjusting nut 102. The micrometer is of the ordinary construction and further description of the same and the operation thereof is deemed unnecessary. The floating abutment 96 which is movable upwardly and downwardly with the lens carriage fits against the flat front face of the stop 97 and is provided at its inner side edge with a hook 103 which engages the inner end edge of the stop 97, as clearly illustrated in Fig. 11 of the drawings, whereby the abutment is slidably connected with the micrometer controlled stop 97. The abutment 96 is connected by a pivot 104 to one end of a bar 105 which has its other end connected to the collar or flange 56 of the gear 55.

The bar 105 which constitutes a connecting member is maintained in a horizontal position without interfering with the rotary movement of the gear 55, and the pivotal mounting of the bar 105 and the pivotal connection of the same to the abutment, together with the slidable connection of the abutment stop 97 permits the micrometer adjustment of the stop. As the grinding stone wears down the unit formed by the plate 82 and the parts mounted thereon is adjusted inwardly so that in effect the micrometer adjustment is relatively small and is not interfered with by the connection of the floating abutment 96 with the collar or flange 56.

The lens 66 is yieldably maintained in engagement with the grinding wheel by means of a coiled spring 106 which is secured at one end by a screw 107 to a post 108 mounted on the plate 21 which is provided with an extension to receive the said post 108. The other end of the spring is connected to one end of a chain 109 which is adjustably connected to the swinging carriage by engaging its outer links with a projection 110 extending from the upper portion of the lower housing 60 of the swinging carriage. The chain forms a convenient means for adjusting the tension of the spring and for detachably connecting the same with the swinging lens carriage, but any other suitable means may, of course, be employed for connecting the spring to the carriage 40, and the yieldable means for urging the swinging carriage inwardly does not interfere with the vertical movement of the lens carriage.

The lower end of the shaft 39 has fixed to it a collar 111 provided with an annular groove 112 which is engaged by opposite projections 113 of a forked end 114 of an oscillating lever 115. The oscillating lever 115 is fulcrumed intermediate of its ends on a depending arm 116 of a bearing bracket 117 by a suitable pivot 118. The bearing bracket 117 is adjustably secured to the lower face of the base of the main frame to enable it to be moved inwardly and outwardly with the adjustable plate 82. The intermediate pivoting of the lever 115 forms front and rear arms, the front arm being provided with the forked end 114 and the rear arm being arranged to cooperate with a compression spring 119 interposed between the rear arm of the lever 115 and the lower face of the frame of the machine to partially counterbalance the weight of the vertically movable shaft 39 and the parts carried thereby to provide for an easy up and down movement of the said shaft 39 and to enable such upward and downward movement to be effected with the expenditure of a relatively small amount of power. Instead of employing a spring, any other suitable means may be provided for counterbalancing or partially counterbalancing the weight of the vertically movable shaft 39 and the parts supported by the same.

The forked arm of the lever 115 is connected by a suitable pivot 120 to the lower end of a connecting rod or member 121 which is connected at its upper end to a crank element 122 by an adjustable wrist pin 123 adapted to vary the stroke of the connecting rod and the degree of oscillation of the lever 115. The crank element is mounted on the stub shaft 124 threaded at its inner end at 125 into a portion of the bearing bracket 117 and provided at its outer end with a head 125 which is countersunk in the crank element.

The crank element is spaced from the bearing bracket by a collar 126 and it is provided at its front face with a wrist pin guide 127 having a diametrically arranged slot 128 recessed at the opposite walls to form inwardly extending overhanging flanges 129 which engage over a squared head 130 at the inner end of the adjustable wrist pin 123. The wrist pin 123 is adapted to slide in the slot to arrange it either in a central position or in an eccentric position. The connecting bar is provided with an opening 130 receiving the wrist pin and the sleeve 131 of a length greater than the thickness of the connecting rod 121 and adapted to be engaged by a clamping nut 132 arranged on an outer threaded portion 133 of the wrist pin. The nut 132 is adapted to clamp the wrist pin in its adjustment without binding against the connecting rod 121.

The crank element is provided at its periphery with teeth 134 which form a worm wheel for meshing with a worm 135 mounted between spaced upper and lower projecting bearing portions 136 of the bearing bracket 117 and arranged on the vertically movable shaft 39. The worm is provided with a pin 137 which extends inwardly into a longitudinal groove 138 in the vertically movable shaft 39. The pin and groove connection between the shaft 39 and the worm 135 permits relative slidable movement of the shaft and at the same time, prevents relative rotary movement so that when the shaft 39 is rotated the worm will be rotated and will impart rotary movement to the crank element 122. This will oscillate the lever 115 and will produce an upward and downward movement of the shaft 39 and the parts carried by the same.

When a single lens or a small number of lenses of a combined width less than the width of the periphery of the grinding wheel are being ground the wrist pin is arranged eccentrically of the crank element to cause an upward and downward movement of the lenses with relation to the grinding face or periphery of the grinding wheel to prevent a groove from being worn in the grinding wheel and chipping of the lenses. When a pile of lenses is being ground equal to substantially the width of the periphery of the grinding wheel the wrist pin is arranged in a central position which eliminates the upward and downward movement of the shaft 39 and prevents the lenses from being moved off the periphery of the grinding stone.

The lower end of the main vertical shaft 9 extends through the bottom wall of the housing 20 and has mounted on it a worm gear 139 which meshes with a worm wheel 140 mounted on a short horizontal shaft 141 to which is secured a pulley 142 which is connected by a belt 143 with a pulley 144 of a rotary pump 145. The short horizontal shaft 141 is journaled in suitable bearings beneath the reservoir and the pulley 144 is mounted on the shaft 144ᵃ of the pump. The pump 145 which is mounted on a frame member 146 is of the ordinary construction and as any construction of pump may be employed, specific description and illustration of the construction of the pump are deemed unnecessary. The inlet of the pump is connected to one end of a pipe 147 which is provided at its other end with an upwardly extending arm or portion 148 which extends through the bottom of the reservoir and projects interiorly of the same above the said bottom a sufficient distance to prevent sediment collecting within the reservoir from entering the feed pipe 147 of the pump.

The reservoir is provided with a drain cock 149 for enabling the reservoir to be drained and cleaned when desired. The outlet of the pump is connected with a discharge pipe 150 which extends upwardly at the column 3 and has its upper portion bent or extended horizontally to form an arm 151 which discharges a stream of water against the periphery of the grinding wheel, as clearly illustrated in Fig. 4 of the drawings. The surplus water is removed from the grinding wheel by a sponge 152 which is mounted upon the column 3 and the water removed from the grinding wheel by the sponge drips back into the reservoir and is used over again. When the machine is in operation there is a continuous circulation of water from the reservoir to the grinding stone and the latter will be supplied with sufficient moisture throughout the entire grinding operation as long as there is water within the reservoir.

The water dripping from the lens or lenses being ground is received within a drip pan 153 loosely arranged on the lower spindle 59 and having a conical sleeve or extension 154 which surrounds the spindle 59 and which extends upwardly from the drip pan to within close proximity to the lower lens clamping member 61. The spindle 59 turns freely in the drip pan and the conical sleeve thereof and the drip pan which is provided at the inner side with a discharge pipe 155 is maintained in proper position with relation to the lens carriage by means of a depending arm 156 located at the upper portion of the housing 60 of the lower arm 54 of the lens carriage and secured to the same by a screw 157 or other suitable fastening device.

The drip pan receives the water dropping from the lenses and discharges the same into the reservoir and prevents the water from dropping upon the gearing for rotating the spindles. The drip pan is adapted to maintain the gearing in a dry condition and will prevent the rusting of the parts which would result if the drip from the lenses is not taken care of and permitted to drop upon the gearing and other portions of the machine. The feed of the water from the reservoir to the pump is controlled by a valve 158 located at the point of connection of the feed pipe to the pump and preferably of the needle valve type, but any suitable valve may, of course, be employed and the valve 158 is also adapted to shut off the flow of water to the pump when desired.

In order to enable the grinding operation and the position of the lens to be readily seen the machine is equipped with an electric light 159 and a reflector 160 suitably mounted on the adjustable post 89 and adapted to be moved inwardly and outwardly with the adjustment of the vertically movable shaft 39. The electric motor and the electric lamp are designed to be furnished with current from a wall socket and while the lamp may be conveniently mounted on the adjustable post 89, any other desired construction and arrangement of lamp may, of course, be employed.

What is claimed is:

1. A lens edge grinding machine, including a frame having a reservoir open at the top, a horizontal rotary grinding element located above and spaced from the open top of the reservoir and having a shaft passing through the reservoir, a vertical pivot shaft slidably mounted on the frame for upward and downward movement, clutch controlled means located above the grinding element for connecting the pivoted shaft with the shaft of the grinding element for rotating the pivot shaft, a horizontally swinging lens carriage mounted on the pivot shaft and carried by the latter in the upward and downward movement of the same and movable horizontally toward and from the grinding element, rotary lens clamping means mounted on the lens carriage and actuated by the pivot shaft and arranged to present the edge of a lens to the periphery of the grinding element, and means located below the reservoir and actuated by the rotary shaft for moving the same upwardly and downwardly, the latter means including a worm arranged on the pivot shaft, said worm and pivot shaft having coacting means for slidably interlocking the pivot shaft with the worm, a crank element having a gear meshing with the worm and a lever oscillated by the crank element and connected with the pivot shaft for raising and lowering the latter.

2. A lens edge grinding machine, including a frame having a reservoir open at the top, a horizontal rotary grinding element located above and spaced from the open top of the reservoir and having a shaft passing through the same, a vertical pivot shaft slidably mounted on the frame for upward and downward movement, means located above the reservoir for rotating the pivot shaft, a horizontally swinging lens carriage mounted on the pivot shaft and carried by the latter in the upward and downward movement of the same and movable horizontally toward and from the grinding element, rotary lens clamping means mounted on the lens carriage and actuated by the pivot shaft and arranged to present the edge of a lens to the periphery of the grinding element and having a hollow vertically slidable spindle adapted to afford a view of the center of the lens during the grinding operation and rotated through frictional contact with the lens and movable upwardly and downwardly to permit a lens to be placed in, adjusted and removed from the lens clamping means without removing the lens clamping means from the grinding machine, and means located below the reservoir actuated by the rotary shaft for moving the same upwardly and downwardly, the latter means including a worm arranged on the pivot shaft, said worm and pivot shaft having coacting means for slidably interlocking the pivot shaft with the worm, a crank element meshing with the worm and having an adjustable wrist pin movable to and from a central position, a lever connected with the wrist pin and with the pivot shaft and adapted to raise and lower the same, said wrist pin being movable to a central position to eliminate the upward and downward movement of the pivot shaft to permit a pile of lenses to be ground without moving a lens off the periphery of the grinding element.

3. A lens edge grinding machine, including a frame, a horizontal grinding element mounted on the frame, a horizontally swinging lens carriage mounted on the frame and movable upwardly and downwardly and horizontally toward and from the grinding element, lens clamping means comprising upper and lower spindles having cooperating lens engaging means and provided with an upper slidably mounted hollow spindle rotated through frictional contact with the lens and permitting a view of the center of the lens during the grinding operation and movable upwardly and downwardly to permit a lens to be placed in, adjusted and removed from the lens clamping means without removing the lens clamping means from the grinding machine, a templet, means for detachably connecting the templet with the lower spindle, a micrometer controlled stop, and a floating abutment slidable on the stop and connected with the carriage and movable upwardly and downwardly with the same and engaged by the templet.

4. A lens edge grinding machine, including a frame, a horizontal grinding element mounted on the frame, a horizontally swinging lens carriage mounted on the frame and movable upwardly and downwardly and horizontally toward and from the grinding element, lens clamping means comprising upper and lower spindles having cooperating lens engaging means and provided with an upper slidably mounted hollow spindle rotated through frictional contact with the lens and permitting a view of the center of the lens during the grinding operation and movable upwardly and downwardly to permit a lens to be placed in, adjusted and removed from the lens clamping means without removing the lens clamping means from the grinding machine, a templet, means for detachably connecting the templet with the lower spindle, a micrometer controlled stop, a floating abutment engaged by the templet and slidable upwardly and downwardly on the said stop and provided with means for slidably engaging the same, a bar pivotally connected with the abutment and with the carriage for relative horizontal movement and forming a horizontal support for the abutment, and yieldable means connected with the carriage for urging the same inwardly.

5. A lens edge grinding machine including a frame comprising a low relatively shallow horizontal approximately cylindrical reservoir open at the top and having supporting legs and constituting the base of the frame and provided at one side with a vertical column and having a central tubular housing extending to substantially the level of the top of the reservoir, a main vertical shaft rising from the open top of the reservoir and having its lower portion mounted in and extending through the said central housing and depending below the reservoir, a motor supported upon the column and having a shaft extending to a point adjacent the upper end of the main vertical shaft, intermeshing gears connecting the said shafts for driving the main vertical shaft directly from the motor, a horizontal grinding wheel mounted on the main vertical shaft between the motor and the reservoir and having its entire periphery located above the reservoir, a pump hung from the lower end of the column, a supply pipe extending from the reservoir to the pump, a discharge pipe extending from the pump and arranged to deliver water to the periphery of the grinding wheel, gearing located below the reservoir for transmitting motion from the lower depending end of the main vertical shaft to the pump for operating the latter, and lens holding means mounted on the side of the reservoir for presenting the edge of a lens to the periphery of the grinding wheel.

6. A lens edge grinding machine including a frame comprising a low relatively shallow horizontal reservoir open at the top and provided at one side with a vertical column, a main vertical shaft mounted in the frame and extending centrally through the reservoir and depending below the same, a motor supported by the column and having its shaft extending to a point adjacent the upper end of the main vertical shaft, a pair of intermeshing gear wheels mounted on the said shafts for driving the main vertical shaft directly from the motor, a pump hung from the lower end of the column and connected with the reservoir and having a discharge pipe extending upwardly on the column and arranged to deliver water to the periphery of the grinding wheel, absorbent material supported by the column and surrounding the terminal portion of the discharge pipe and embracing a portion of the periphery of the grinding wheel, gearing located below the reservoir for connecting the pump with the lower end of the main vertical shaft for driving the pump, and lens holding means for presenting the edge of a lens to the periphery of the grinding wheel.

7. A lens edge grinding machine including a frame comprising a low relatively shallow horizontal reservoir open at the top and having supporting legs and constituting the base of the frame and provided at one side with a vertical column supported by the reservoir, a main vertical shaft mounted in the frame and extending centrally through the reservoir and depending below the same, a motor supported by the column and having its shaft extending to a point adjacent the upper end of the main vertical shaft, a pair of intermeshing gear wheels mounted on the said shafts for driving the main vertical shaft directly from the motor, a pump hung from the lower end of the column and connected with the reservoir and having a discharge pipe extending upwardly on the column and arranged to deliver water to the periphery of the grinding wheel, gearing located below the reservoir and supported by the same for operating the pump comprising a worm mounted on the lower end of the vertical shaft, a worm wheel actuated by the worm, and means comprising pulleys and a belt for transmitting motion from the worm wheel to the pump, and lens holding means mounted on the side of the reservoir for presenting the edge of a lens to the periphery of the grinding element.

8. A lens edge grinding machine including a frame comprising a low relatively shallow horizontal reservoir open at the top and having supporting legs and constituting the base of the frame and provided at one side with a vertical column, a main vertical shaft mounted at its lower end in the main frame centrally of the horizontal reservoir and rising from the open top thereof, a motor supported upon the column and having its shaft extending to a point adjacent the upper end of the main vertical shaft, a pair of intermeshing gears mounted on the said shafts for driving the main vertical shaft directly from the motor, a vertically slidable pivot shaft mounted on one side of the reservoir at a point spaced from the said column, a swinging lens carriage mounted on the pivot shaft and carried by the same and arranged to move inwardly and outwardly over the reservoir, a horizontal grinding wheel mounted on the main vertical shaft between the motor and the reservoir and having its entire periphery located above the open top of the reservoir, rotary lens clamping means carried by the lens carriage and including a hollow upper vertical spindle slidably mounted and permitting a view of the lens during the grinding operation and also permitting the lens to be placed in, adjusted, and removed from the lens clamping means without removing the lens clamping means from the machine, gearing supported by the said column and actuated by the main vertical shaft for rotating the vertically slidable pivot shaft and the lens clamping means, and means located below and supported by the reservoir and connected with and actuated by the vertically slidable pivot shaft for moving the pivot shaft upwardly and downwardly during the operation of the machine.

9. A lens edge grinding machine including a frame comprising a low relatively shallow horizontal reservoir open at the top and having supporting legs and constituting the base of the frame and provided at one side with a vertical column supported by the reservoir, a main vertical shaft mounted at its lower end in the frame centrally of the horizontal reservoir and rising from the open top thereof in substantial parallelism with the column, a motor supported upon the column and having its shaft extending to a point adjacent the upper end of the vertical shaft, a pair of intermeshing gears mounted on the said shafts for driving the main vertical shaft directly from the motor, a horizontal grinding wheel mounted on the main vertical shaft between the motor and the reservoir and having its entire periphery located above the open top of the reservoir, a vertical pivot shaft mounted on one side of the horizontal reservoir at a point spaced from the said vertical column, a horizontal swinging lens carriage mounted on the pivot shaft and arranged to swing over the reservoir, lens clamping means carried by the lens carriage and comprising upper and lower spindles, the upper spindle being hollow and slidably mounted to move upwardly and downwardly and provided at the upper end with a flaring portion arranged to afford a view of the clamped portion of the lens during the grinding operation and permitting the lens to be placed in, adjusted and removed from the lens clamping means without stopping the grinding machine, clutch controlled gearing connecting the upper end of the pivot shaft with the main shaft for rotating the pivot shaft, separate gearing connecting the pivot shaft with the lower spindle of the lens clamping means, and means located below and supported by the reservoir and connected with the lower end of the pivot shaft and actuated by the latter for raising and lowering the pivot shaft and the lens carriage during the operation of the machine.

10. A lens edge grinding machine including a frame comprising a low relatively shallow horizontal reservoir open at the top and having supporting legs and constituting the base of the frame and provided at one side with a vertical column, a main vertical shaft mounted at its lower end in the frame centrally of the horizontal reservoir and rising from the open top thereof, a motor supported upon the column and having its shaft extending to a point adjacent the main vertical shaft, a pair of intermeshing gears mounted on the said shafts for driving the main vertical shaft directly from the motor, a horizontal grinding wheel mounted on the main vertical shaft at a point between the motor and the reservoir and having its entire periphery located above the open top of the reservoir, a rotary pivot shaft mounted on the reservoir at one side thereof, a horizontal swinging lens carriage pivoted by the rotary pivot shaft and arranged to swing over the reservoir, rotary lens clamping means mounted on the carriage, gearing for connecting the rotary pivot shaft with the lens clamping means, separate gearing supported by the column for connecting the pivot shaft with the main shaft including a clutch for coupling the pivot shaft with the last mentioned gearing and for uncoupling it therefrom to start and stop the rotary lens clamping means without starting and stopping the main shaft and grinding wheel, and means including gearing located beneath and supported by the reservoir and connecting with and actuated by the vertical shaft for raising and lowering the lens carriage during the operation of the machine.

11. A lens edge grinding machine including a frame comprising a low relatively shallow horizontal reservoir open at the top and having supporting legs and constituting the base of the frame and provided at one side with a vertical column, a main vertical shaft mounted in the frame and rising from the center of the open top of the reservoir, a motor supported upon the column and having its shaft extending to a point adjacent the main vertical shaft, a pair of intermeshing gears mounted on the said shafts for directly driving the main vertical shaft from the motor, a horizontal grinding wheel mounted on the main vertical shaft between the motor and the reservoir and having its entire periphery located above the open top of the reservoir, a horizontal swinging lens carriage movable over the reservoir toward and from the grinding wheel and provided with rotary lens clamping means comprising upper and lower vertical spindles, gearing connected with the lower spindle for rotating the lens clamping means, means for conveying water from the reservoir to the grinding wheel, and a water receptacle arranged on the lower spindle in a position to receive drip from a lens and provided at its inner end with a spout extending inwardly and discharging into the open top of the reservoir, said water receptacle being carried by the lens carriage in the swinging movement thereof.

12. A lens edge grinding machine including a frame comprising a low relatively shallow horizontal reservoir open at the top and provided at one side with a vertical column, a main vertical shaft mounted in the frame and rising from the center of the open top of the reservoir, a motor supported upon the column and having its shaft extending to a point adjacent the main vertical shaft, a pair of intermeshing gears mounted on the said shafts for directly driving the main vertical shaft from the motor, a horizontal grinding wheel mounted on the main vertical shaft between the motor and the reservoir and having its entire periphery located above the open top of the reservoir, a horizontal swinging lens carriage movable toward and from the grinding wheel and provided with rotary lens clamping means comprising upper and lower vertical spindles, gearing connected with the lower spindle for rotating the lens clamping means, means for conveying water from the reservoir to the grinding wheel, and a water receptacle arranged to receive drip from a lens and having a conical sleeve loosely arranged on the lower spindle, said conical sleeve being of less diameter than the water receptacle and the latter being provided at its inner side with a spout extending inwardly over the reservoir and discharging into the reservoir water collecting in the receptacle from the said drip.

13. A lens edge grinding machine including a frame comprising a low relatively shallow horizontal reservoir open at the top and having supporting legs and constituting the base of the frame and provided at one side with a vertical column supported by the reservoir, a main vertical shaft mounted in the frame and extending centrally through the said reservoir and depending therefrom and rising from the open top of the reservoir, a motor supported upon the column and having its shaft extending to a point adjacent the upper end of the main vertical shaft, a pair of intermeshing gears connecting the motor shaft with the upper end of the main vertical shaft for driving the latter directly from the motor, a horizontal grinding wheel mounted on the main vertical shaft between the motor and the reservoir and having its entire periphery located directly above the open top of the reservoir, a pump hung from the lower end of the column and connected with the reservoir and provided with a discharge pipe extending upwardly on the column and arranged to deliver water to the grinding wheel, gearing located below and supported by the reservoir and connected with the lower end of the main vertical shaft and with the pump for operating the latter, a horizontally swinging lens carriage supported by the reservoir at one side thereof and movable over the reservoir toward and from the grinding wheel and provided with rotary lens clamping means comprising upper and lower spindles, gearing connected with the lower spindle for rotating the lens clamping means, and a water receptacle arranged on the lower spindle in a position to receive drip from a lens being ground and provided at its inner side with a spout extending inwardly over the reservoir and discharging into the same, the water received in the receptacle from the said drip, said water receptacle being carried by the lens carriage in the swinging movement thereof.

14. A lens edge grinding machine including a frame comprising a low relatively shallow horizontal reservoir open entirely at the top and having supporting legs and constituting the base of the frame, said reservoir being provided at the center with a tubular bearing extending above the water level in the reservoir, and a vertical column rising from the reservoir at one side thereof and supported by the said reservoir and having an arm at the upper end provided with an upper bearing, a main vertical shaft mounted at its upper portion in the said upper bearing and at its lower end in the tubular bearing of the reservoir and rising therefrom in substantial parallelism with the column, a motor supported upon the column and having its shaft extending to a point adjacent the upper end of the main vertical shaft, a pair of intermeshing gears mounted respectively on the upper end of the main vertical shaft and on the motor shaft for driving the main vertical shaft directly from the motor, a horizontal grinding wheel mounted on the main vertical shaft at a point between the motor and the reservoir and being of a diameter slightly less than that of the interior of the reservoir and having its entire periphery located directly over the reservoir, and lens holding templet controlled means mounted on the reservoir for presenting the edge of a lens to the periphery of the grinding wheel.

RUDOLF KMENT.